(12) United States Patent
Wolfe (10) Patent No.: US 9,378,473 B2
(45) Date of Patent: Jun. 28, 2016

(54) CONTENT AND APPLICATION DELIVERY NETWORK AGGREGATION

(76) Inventor: Alexander Wolfe, London (GB)

( * ) Notice: Subject to any disclaimer, the term of this patent is extended or adjusted under 35 U.S.C. 154(b) by 698 days.

(21) Appl. No.: 13/579,356

(22) PCT Filed: Feb. 17, 2011

(86) PCT No.: PCT/US2011/025251
§ 371 (c)(1),
(2), (4) Date: Aug. 16, 2012

(87) PCT Pub. No.: WO2011/103293
PCT Pub. Date: Aug. 25, 2011

(65) Prior Publication Data
US 2012/0317291 A1    Dec. 13, 2012

Related U.S. Application Data

(60) Provisional application No. 61/305,329, filed on Feb. 17, 2010.

(51) Int. Cl.
*G06F 15/173* (2006.01)
*G06Q 10/06* (2012.01)
(52) U.S. Cl.
CPC ..................................... *G06Q 10/06* (2013.01)
(58) Field of Classification Search
CPC ................................................. H04L 67/1078
See application file for complete search history.

(56) References Cited

U.S. PATENT DOCUMENTS

| 7,149,797 | B1 * | 12/2006 | Weller et al. ................. 709/223 |
| 2003/0229682 | A1 | 12/2003 | Day |
| 2007/0042332 | A1 * | 2/2007 | Leem ............................ 434/156 |
| 2007/0174442 | A1 * | 7/2007 | Sherman et al. ............. 709/223 |
| 2008/0235361 | A1 * | 9/2008 | Crosbie et al. ............... 709/223 |
| 2011/0145317 | A1 * | 6/2011 | Serban et al. ................ 709/203 |

FOREIGN PATENT DOCUMENTS

| JP | 2001-306433 | 11/2001 |
| KR | 10-2004-0001550 | 1/2004 |

OTHER PUBLICATIONS

"Collaboration Opportunities for Content Delivery and Network Infrastructures"—Frank et al, Sigcomm Org, Sep. 2009 http://sigcomm.org/education/ebook/SIGCOMMeBook2013v1_chapter7.pdf.*

Kim Seonho et al., A Design of Redirection System for Server Selection on 1-22 the Content Distribution Environment, The Journal of Korea Information and Communications Society, 2004, 04-2 vol. 29, No. 2C, pp. 283-290.

* cited by examiner

*Primary Examiner* — Randy Scott
(74) *Attorney, Agent, or Firm* — Gottlieb, Rackman & Reisman, PC (57) ABSTRACT

An aggregation or combination of Content or Application Delivery Networks is disclosed to improve quality of service, including the delivery of content and media on a city, state, country and international basis. The aggregation is formed by combining multiple CDNs or ADNs so that a larger server and network footprint is created. The benefits of each CDN or ADN are aggregated to produce a better CDN/ADN service to the customer and end users.

16 Claims, 4 Drawing Sheets

CONTENT AND APPLICATION DELIVERY NETWORK AGGREGATION

This application claims priority of provisional application U.S. 61/305,329, filed Feb. 17, 2010.

FIELD OF THE INVENTION

This invention relates to Content and Application Delivery Networks and their aggregation or combination to improve quality of service.

BACKGROUND OF THE INVENTION

A content delivery network or content distribution network (CDN) is a system of computers containing copies of data, placed at various points in a network so as to maximize bandwidth for access to the data from clients throughout the network. A client accesses a copy of the data near to the client, as opposed to all clients accessing the same central server, so as to avoid a bottleneck near that server. A similar system, but one that can run dynamic content like executable scripts or applications is termed an application delivery network (ADN). Examples of such scripts are .php or .asp rather than just static content like an image. In the following description each reference or figure label that refers to CDN could be replaced by ADN in its description.

Content types include web objects, downloadable objects (media files, software, and documents), applications, real time media streams, and other components of internet delivery (DNS, routes, and database queries).

CDNs generally deliver content over TCP and UDP connections. TCP throughput over a network is impacted by both latency and packet loss. In order to reduce both of these parameters, CDNs traditionally place servers as close to the edge networks that users are on as possible. Theoretically the closer the content the faster the delivery, although network distance may not be the factor that leads to best performance. End users will likely experience less jitter, fewer network traffic peaks and surges, and improved stream quality—especially in remote areas. The increased reliability allows a CDN operator to deliver HD (High Definition) quality content with high Quality of Service, low costs and low network load.

Other benefits include Redundancy (alternative networks & servers ready on stand by), Load Balancing (distribution across multiple servers & networks), High Availability (quick recovery from any failure or outage), and Failover (secondary systems take over when the primaries fail).

If there is a server failure e.g. caused by a power cut, no data is lost and the end user is redirected to a copy of the website or video on another server at another data centre either in their city or if required another country. This allows for 100% Service Level Agreements and military grade hosting. CDN delivery is essential for Web 2.0 applications and next generation internet delivery at high bitrates with large volumes. e.g. Video and IPTV (e.g. BT Vision, FiOS TV).

There is a clear trend in the Internet hosting industry for a move from centralised hosting to CDN delivery. Currently there are a huge number of hosting companies who serve all their customer's content from a single data centre in a single city and country. This means slow delivery of a customer's content. It is unreliable and subject to failures with no alternative source of delivery or network path to the end user.

Many providers still use only one physical server e.g. a shared or dedicated server product. If a server fails the customer gets a 'not found' or similar type of error in their web browser or media player until the ISP (Internet Service Provider) can get a person to fix the server—a slow process. Some customer sites have been known to go down for days.

If the hosting provider only uses one network provider that becomes overloaded or subject to a denial of service attack by hackers, the delivery of all customers' content on that network will be affected even if they are not the target. This can also happen at busy times of the day and is known as network congestion.

Backups do not take place in real time and so customer content is usually stored in a single data centre even with a regular backup strategy. It is not replicated automatically to servers distributed globally and is therefore vulnerable at a single point of failure to power cut, fire or other outage incident.

BRIEF DESCRIPTION OF THE INVENTION

The invention comprises the aggregation or combination of Content Delivery Networks to improve quality of service, including the delivery of content and media on a city, state, country and international basis.

By combining multiple (two or more) CDNs a larger server and network footprint can be created. The benefits of each CDN are aggregated to produce a better CDN service to the customer and end users. Some CDNs have their servers located mainly in one continent e.g. North America where others may be located mainly in Asia or Europe.

Servers will be located in a data centre in multiple cities within a particular country and known as a POP (Point of Presence). CDNs do not have POPs in every city or every country globally. For example by combining a CDN based mainly in the USA and another in Asia, a more effective larger CDN composite is created which delivers a better level of service with more servers located nearer to the end user. This improves user experience. For example when watching a broadband video stream buffering can occur or playback can stop entirely. The chances of that happening are reduced when media can be viewed from a CDN whose servers are closest to the viewer.

CDNs have different network providers who provide physical network connections between Data Centres. By combining different CDNs the benefits of multiple network providers can be obtained. For example some may have more fibre optic lines and capacity to Hong Kong; others may have more to South Africa. Some network provider's lines can be congested; others maintain spare capacity to improve delivery speeds at busy times.

By combining multiple CDNs increased reliability is obtained. When one CDN fails an alternate CDN can be used instead in a process known as failover but on a CDN level. When a CDN is over capacity an alternate CDN can be used as well in a process known as Load Balancing but on a CDN level. e.g. for large global live webcasts. Media and content is replicated amongst multiple CDNs thus providing multiple backups.

Most CDNs only support one or two media formats e.g. Flash and Windows Media where others support additional formats e.g. 3GP for mobile delivery or HTTP segmentation for Live iphone streaming. CDN aggregation gives customers access to all formats via different CDNs.

Some CDNs only support a single delivery method or protocol e.g. HTTP for download or caching where as others support RTMP or RTSP for streaming. CDN aggregation gives customers access to all delivery methods and protocols via different CDNs.

In summary CDN Aggregation creates increased:
speeds of delivery, load balancing, availability, redundancy, failover and backups.

Quality Of Service and choice is improved and Service Level Agreements can be increased.

The present invention allows customers to share Servers, Storage and Bandwidth from multiple CDNs. Each CDN has strengths in different cities or countries with their respective server capacity in various data centres. They also have network connections from various providers (e.g. BT, AT&T, NTT, Global Crossing, Savvis, Fibernet, Telianet and Qwest). By combining CDNs a global delivery network is created that is better than any of the individual component networks. This combination of CDNs provides increased speeds of delivery, load balancing, high availability, massive redundancy, globalised failover and automated backups. Service Level Agreements and Quality Of Service exceed individual CDNs.

The customer's end users are automatically redirected to the best CDN nearest to them. If one of the CDNs is overloaded e.g. due to a large live webcast or has a failure they would be redirected to another CDN which would be with a different network provider in a different data centre located in a different city or even country.

DETAILED DESCRIPTION OF PREFERRED EMBODIMENTS OF THE INVENTION

Figure 1:
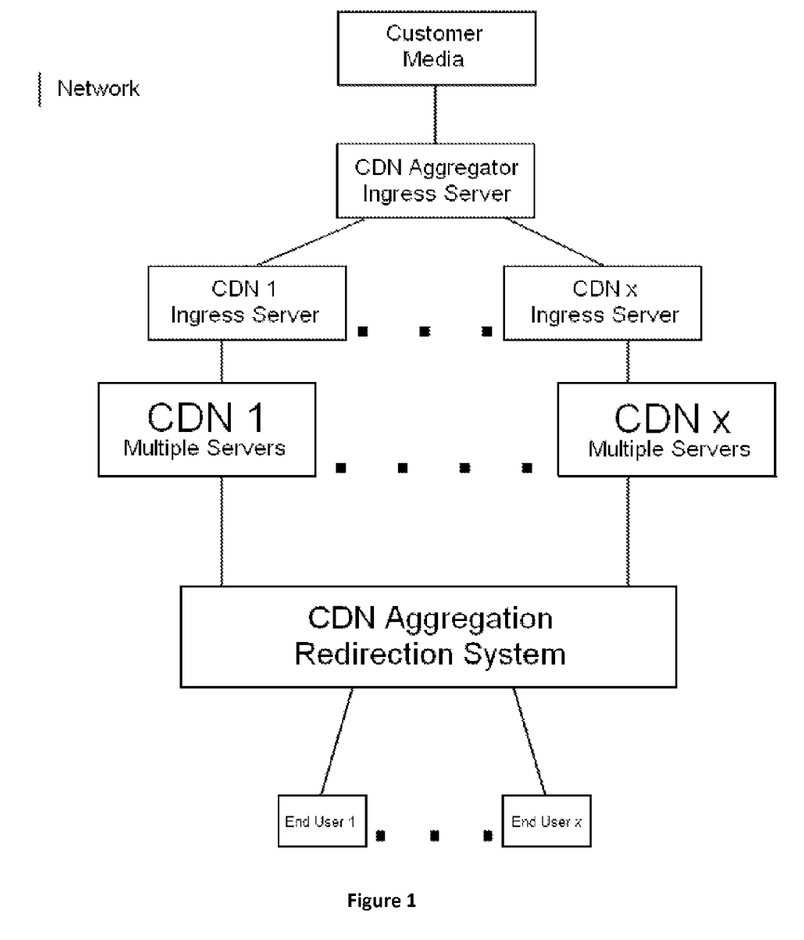
FIG. 1 is a flow chart depicting operation of the invention.

As shown in FIG. 1, the invention comprises a CDN Aggregation Ingress Server. The invention proceeds as follows:
1) A customer transfers their media (Web Object, Video or Audio) by FTP or other method to the CDN Aggregator Ingress Server.
2) The CDN Aggregator Ingress Server then replicates this media onto the constituent ingress server of a particular CDN (CDN 1).
3) Step 2 is repeated for each CDN (CDN x) that the CDN Aggregator has chosen to replicate to.
4) Each CDN then starts their own internal process for replication to their media delivery servers in different data centres globally.
5) Customers of the CDN Aggregator receive a link (either by email, text message or within a webpage) that points to the redirection system of the CDN Aggregator. The redirection system may use various different methods of redirection, ether software or hardware based.
6) The link can then be forwarded on by email or text message or published in a website.

The link can be to a media player which pulls an external url or data file e.g. xml.

7) The link is adapted such that when the link is clicked by one of the customers end users, a CDN Aggregation Redirection System determines where in the world that end user is located for example by reverse IP address lookup and redirects them to the best CDN for their location. That could be their nearest, least congested, best quality or best priced CDN as determined by the CDN aggregator.
8) If no response is received for example by the media player or web browser, the link then fails over to another CDN. The backup CDN is specified in the link itself or constituent media player reference file e.g. xml data file for flash media player.

The invention further comprises a website that allows customers to sign up online by using an automated web based provisioning system. The website can show how many servers are on the network and in how many locations and countries (larger capacity than any individual CDN can quote).

The potential customer can register their company details, they then agree to a contract online and choose the amount of bandwidth and storage they want and in which formats e.g. Flash or Windows Media.

The invention will support all formats including Silverlight smooth streaming, 3GP for mobile and H.264 for iPhones, Quicktime, Shoutcast, podcasts amongst others on request, whereas most CDNs only support 1 or 2 formats.

Using the invention software it is possible to deploy separate and bespoke CDNs tailored to customer requirements. An organisation may prefer to use certain CDNs over others for various reasons e.g. the kind of content they host or the type of customers they do business with e.g. Adult, Political or Religious content.

CDN Aggregation Ingress

Figure 2:
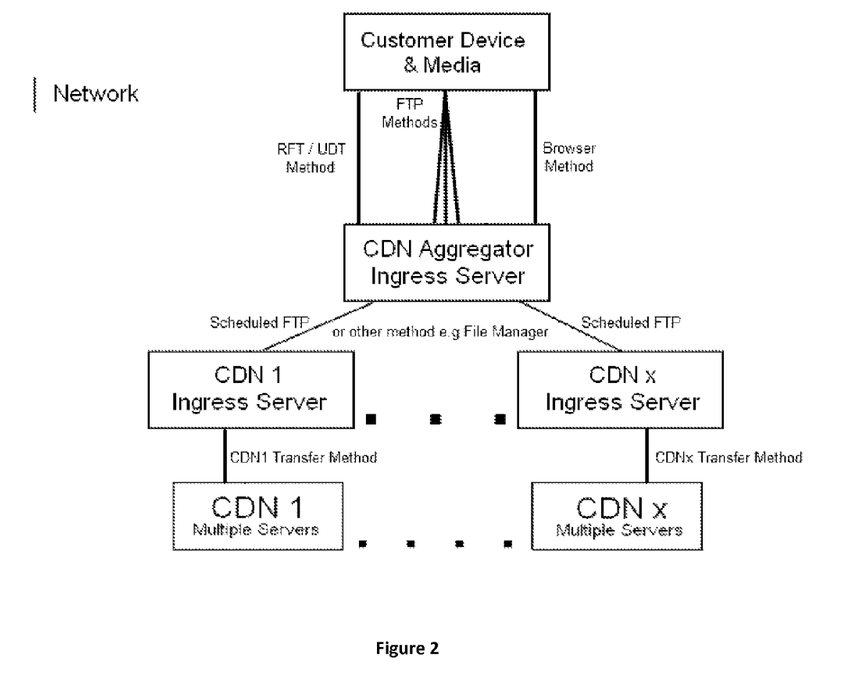
FIG. 2 depicts the configuration of a system employing a CDN Aggregator Ingress Server.

The first steps of CDN Aggregation before the CDN Aggregation Redirection System can operate involves the Ingress of media to the CDN Aggregator from the customer, as depicted in FIG. 2.

This is summarised as follows:
1) A customer transfers their media (Web Object, Video or Audio) by FTP or other method to the CDN Aggregator Ingress Server.
2) The CDN Aggregator Ingress Server then replicates this media onto the constituent ingress server of a particular CDN (CDN 1).
3) Step 2 is repeated for each CDN (CDN x) that the CDN Aggregator has chosen to replicate to.
4) Each CDN then starts their own internal process for replication to their media delivery servers in different data centres globally.
5) Customers of the CDN Aggregator receive a link (either by email, text message or within a webpage) that points to the redirection system of the CDN Aggregator. The redirection system may use various different methods of redirection, ether software or hardware based.
6) The link can then be forwarded on by email or text message or published in a website. Note: the link can be to a media player which pulls an external URL or data file e.g. xml.

Step 1

A customer transfers their media to the CDN Aggregator.
a) This will typically involve the transfer of files e.g. Data or Media from their or their end user's computer (PC, Mobile Device, Gaming Console or Set Top Box) over the Internet to one of the CDN Aggregator's Ingress Server(s).
b) This can also include the transfer of files from another server, which may be where the customer's files are currently held, directly to the CDN Aggregators' Ingress Server(s).

Methods of Transfer:
1) RFT (Rapid File Transfer)—which can accelerate normal file transfer speeds by up to 10 times. Software includes UDT protocol transfers (UDT is a UDP based application level data transport protocol for distributed data intensive transfers over WANs), Delta Transfers (only transfers what data has changed in a file), Swarming (enable transfer from multiple locations at once) and file deletion protection. Automatic file detection, failure detection and transfer.

2) BBT (Browser Based Transfer)—using any standard web browser to upload content directly from the device the browser is on to the CDN Aggregator's Ingress Server. Useful for non technical users. Has an accurate progress bar that uses server side scripts to pass back real values for percentage progress, total file size, file size transferred so far, speed of transfer. Supports multiple file transfers in a single batch.

3) FTP (File Transfer Protocol) which is historically the most common way to transfer files over the internet. Passive Mode or Active (port) Mode FTP can be used. For large numbers of simultaneous file transfers with supporting servers doing file transfer resume if interrupted.

4) sFTP (SSH File Transfer Protocol) which is similar to 3) except can operate over a single port which allows for transfer through internal or external firewalls.

5) FTPS (FTP over Implicit TLS/SSL).

6) FTPES (FTP over explicit TLS/SSL).

7) NetBios, SMB/CIFS (Windows File Sharing), Samba and AFP (Apple File Sharing) are also supported transfer methods.

These methods can all be scheduled e.g. for large/overnight transfers/backup replication. An email with a report can be sent to a distribution list to notify a successful or failed transfer.

The key is that CDN Aggregation offers many methods of ingress of data to the CDN Aggregator's Ingress server(s) unlike a standalone CDN who will only offer 3) FTP as the transfer method.

CDN Aggregator Ingress Servers can be a single or multiple servers (e.g. for redundancy) they can also be located in distributed global locations for faster transfer speeds as they will be nearer their local customer or user. DNS entries can be used to direct customers to their near ingress server and be used for failover of the ingress server.

Step 2

The CDN Aggregator Ingress Server then replicates this media onto the constituent ingress server of a particular CDN.

As the standard method of transfer that a CDN will support is FTP, the CDN Aggregator's software will FTP the content to the target CDN using either Passive or Active (Port mode). This will use error catching to retry or resume any failed transfers and will be scheduled to check for newly uploaded files to transfer automatically. A file manager can also be used as an alternative.

Step 3

Step 2 is repeated for each CDN (CDN x) that the CDN Aggregator has chosen to replicate to.

The CDN Aggregator's transfer software takes a list of target CDN's FTP details e.g. by a data file XML or a database.

Pseudo Code:

```
Set Variables from files / database
config.ini      general program variables, source path, language
Servers.ini     target CDN server list e.g. CDN1 ... CDNx
                Host: NOC.CDNx.com, Username, Password, FTP port
Extensions.ini  extension / file type list - depending on type of file
                transfer to a particular CDN
Check (Time)
Start (Log) output
```

```
Check to see if program is running already
Open (inventory file) so once file is transferred it is not transferred again
Get (FileList) from local source directory (traverse sub directories,
multiple levels supported)
Check (filetype) choose correct target CDN location
Function Put (FileList)
Open (FTP connection) try passive then port modes
Put (Filelist) to remote path
REPEAT Put (for CDNx)
Update(Log)
End
```

Step 4

Each CDN then starts their own internal process for replication to their media delivery servers and storage in different data centres globally.

Step 5

Customers of the CDN Aggregator receive a link (either by email, text message or within a webpage) that points to the redirection system of the CDN Aggregator. The redirection system may use various different methods of redirection, ether software or hardware based.

Software is scheduled to scan target ingress servers of CDN 1 ... CDNx for completed file transfers once one or many of those transfers are complete, it creates the link files and emails them to a distribution list:

Customer Name,

Here is the link to the player we made to show your media:

http://links.CDNag.com/cust1/%2F2010-01-01%2Ffilename.flv

These CDN aggregator's links provide geographical redirection to the viewer's nearest and best CDN for optimal playback.

Embed this link in a website by using iframe or object tags.

Regards,

Support Team

Step 6

The link can then be forwarded on by email or text message or published in a website. Note: the link can be to a media player which pulls an external url or data file e.g. xml These can also be sent as text messages, RSS feeds, automatically generated webpages or as INSERTs into a database e.g. for a customer's CMS (Content Management System).

The invention software preferably comprises the following modules:

Transfer

Rapid File Transfer software with transfer speeds up to ×10 faster than normal methods (e.g. FTP).

As well as content uploading to servers it also supports point to point transfers e.g. of a Film from an Edit suite in London to another in LA.

Other features: UDT protocol transfers, Delta Transfers and swarming.

Upload

A browser based upload software that allows any end user to upload content to the ingress servers without having the technical knowledge to use FTP or buy an FTP client. Also useful as a trial or evaluation tool. Has a progress bar showing % of upload completed so far (accurate using server side technology).

Provision

Software for automatically provisioning a new customer account. The web based interface allows non technical staff to login and create a new instance of the CDN software. They also allocate a username and email address which is then used by the playergen software for publishing of their media.

CDN Aggregator Provision software is used for provisioning new customers to the CDN Aggregator.

Usually located on the CDN Aggregator's NOC or Ingress Server. It is a web based system for staff to access by secure login. Ideal for non technical people.

Process:

1) The Customer's name or code is entered (e.g. cust1).
2) Their contact details including address, phone number and email address are entered.
3) A strong password is automatically generated.
4) The correct package is selected by the operator.

These are set up by the Administrator initially e.g. Entry Level—10 GB bandwidth and 100 GB storage or per GB transfer pricing.

5) Access to the reporting system is granted.
6) All the correct scripts, html and media player files are copied to a newly created dir named after the customer (e.g. cust1). This is a subdirectory within the root dir of the CDN aggregator.
7) A task manager or scheduled process runs a script which in turn runs the CDN Aggregation Link or Player Generator in each customer directory in turn. Thus creating a link for any new media uploaded to the Ingress server and uploading the link to the web server platform or ADN.
8) The CDN Aggregation Link is sent to the address stated in 2) for every file uploaded and replicated:

Customer Name,

Here is the link to the player we made to show your media:
http://links.CDNag.com/cust1%2F2010-01-01%2Ffilename.flv These CDN aggregator's links provide geographical redirection to the viewer's best CDN and nearest server for optimal playback.

Embed this link in a website by using iframe or object tags.

Regards,

Support Team

8) A welcome letter with the customer's newly created account details is send to the email address stated in 2)

Welcome to the CDN Aggregator

Your account is now setup and ready to use. Support in the first instance is to support@CDNa.com Here are your account details using the main formats, others available on request.

Transfer details to our Ingress server:

For an FTP, FTPs or sFTP client:

Host: NOC.CDNag.com

Username: cust1

Password: xxxxxxx

After uploading your files, please wait a few minutes for them to be replicated onto the constituent media servers globally, they can then be played with these URLs:

Flash .flv .mp4 .m4v .m4a .mp3 .f4v

CDN Aggregator Player (change file):
http://players.CDNag.com/players/VOD/cust1/player.php?width=640&height=480&icons=false&fullscreen=true&controlbar=over&backcolor=000000&frontcolor=999999&lightcolor=0066FF&autostart=true&streamer=rtmp://cust1.fms.cdn.CDNag.com/001XX/cust1/&file=filename.flv this can be embedded in your web page using an IFRAME or OBJECT tag e.g.:

<IFRAME
src="http://players.CDNag.com/players/VOD/cust1/player.php?width=640&height=480&icons=false&fullscreen=true&controlbar=over&backcolor=000000&frontcolor=999999&lightcolor=0066FF&autostart=true&streamer=rtmp://cust1.fms.cdn.CDNag.com/001XX/cust1/&file=filename.flv" width="640" height="480" frameborder="0" scrolling="no" marginwidth="0" marginheight="0" align="center"></IFRAME>

Windows Media .wmv .wma

Use in a Silverlight app or our Silverlight player:
http://players.CDNag.com/players/VOD/cust1/player.php Web Objects .html .swf .asx .jpg .gif .pdf .doc .xls .txt .xml etc.

URL:
http://players.CDNag.com/cust1/filename.htm

These links will deliver your media automatically from the optimal CDN for delivery to the viewer.

Let us know if you have any questions,

Best regards,

Support Team

6) A log of the above processes is made to a file for reference purposes.

NOC

The software redirects end users to their nearest CDN depending on where they are located globally this increases quality of media delivery. There is also a web based provisioning system and an ingress server that automatically replicates content to constituent CDNs globally.

Figure 3:
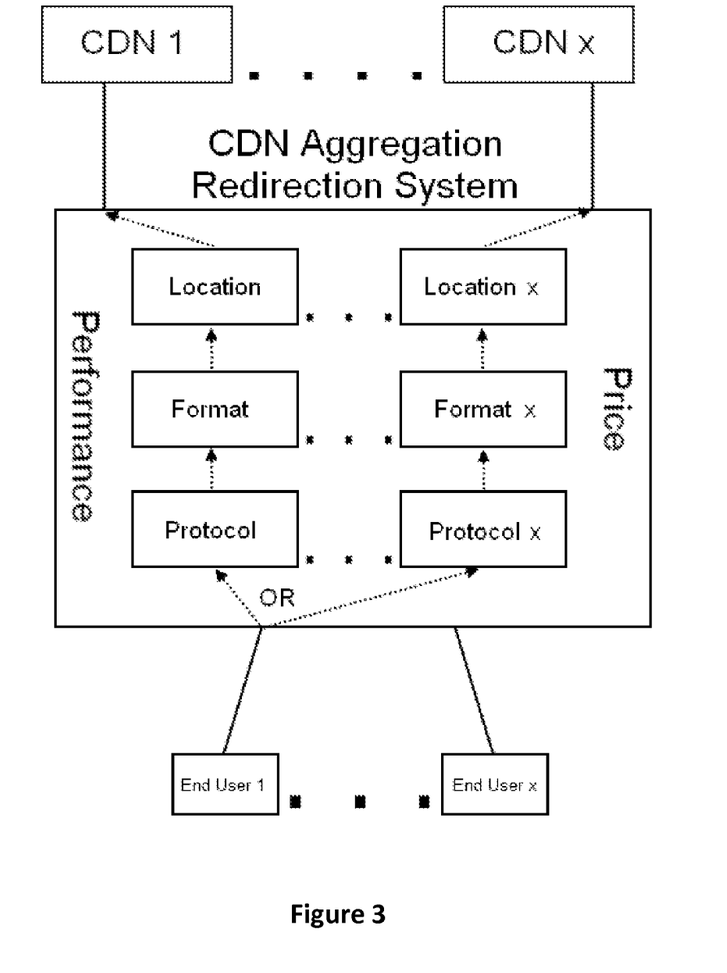
FIG. 3 depicts the configuration of a system employing a CDN Aggregation Redirection System.

This CDN Aggregation Redirection System is depicted in FIG. 3. It enables a user's web browser or Set Top Box to receive a dynamically generated link or url that is created in realtime on the serverside. The server (or multiple distributed servers) that generate these links can be called the NOC (Network Operations Center). Its purpose is to direct or redirect the end user or viewer to the best CDN to view their media from. This can be based on Performance—determined by metrics testing of various CDNs by many means e.g. trace routes, pings, latency, frame drop, buffering. This can obtained via independently produced reports and data either in real time or set manually;

Location—determined by a particular CDN's coverage of a geographical region. Most cover USA where as only some cover Asia well. CDN 1 is used for delivery of content or media to viewers in the Americas where as CDN 2 or combination of others is used for Asia or the rest of the world.

Price—determined by the cost of delivery via CDN 1 versus another or the premium charges for delivery to Asia with CDN 2 or elsewhere by uncongested network routes.

Format—media or content format type e.g. Flash from CDN 1, Windows Media from CDN 2 or Mpeg4 for mobile devices from CDN 3

Protocol—the network protocol used for delivery, e.g. HTTP from CDN 1, RTMP from CDN 2 or RTSP from CDN 3

It is also possible to load balance all of the above decisions by sending a percentage of requests to CDN1 and a percentage to another CDNx with the rest going to a default e.g. CDN1.

A preferred pseudo code for a CDN Aggregation Redirection System is the following Load
  instance of Geographical database for: IP address to country, region or city lookup
    Declare variables in script or software
    Once user / viewer's IP address is determined e.g. by Reverse IP address lookup

```
Then
    redirect user to appropriate URL & CDN for their location:
        1) USA (Multiple region, city options)
            URL1 (CDN1)
        or
        2) UK (Multiple region, city options)
            URL2 (CDN2)
        or
        3) ASIA (Multiple country , region, city options)
            URL3 (CDN3)
        or
        4) Rest of Europe (Multiple country , region, city options)
        Load Balance 20%
            URL1 (CDN1)
        and
        Load Balance 80%
            URL3 (CDN3)
        Else if
            Rest of the World
            URL1 (CDN1)
END
```

Preferred examples of URLs are:
RTMP://subdomain.cdn1.domain.com/mountpoint/customer/filename.flv
HTTP://subdomain.cdn2.domain.com/mountpoint/customer/filename.mp3
URLs can contain custom ports, protocols and other variables like media players:
http://subdomain.cdn1.domain.com/players/VOD/customer/
   player.php?width=640&height=480&fullscreen=true&controlbar=over&autostart=true&streamer=rtmpt://subdomain.fms.cdn1.domain.com/001A8A/customer&file=Showreel_750.flv
and playlists for failover or dynamic bitrate streaming:
http://subdomain.cdn2.domain.com/payers/VOD/customer/
   player.php?width=640&height=360&icons=false&fullscreen=true&stretching=none&controlbar=over&autostart=true&file=http://subdomain.cdn2.domain.com/players/VOD/customer/dynamic1.xml The CDN Aggregator Playergen program generates CDN Aggregator Redirection scripts, links and actual media players for each piece of content. This is depicted in FIG. 3.

Once content is uploaded to the ingress server(s) the software detects it and automatically creates a CDN Aggregator Redirection script for each piece of content (dynamically generated) and uploads this new program to a web server or ADN (Application Delivery Network).

An email is then created and sent to a distribution list with the links to the media players in it. This link can be easily embedded by anyone into any web page or CMS using a simple IFRAME, DIV or object tag.

A preferred Pseudo Code for the CDN Aggregator Playergen is the following:

```
Set Variables from files / database
config.ini    general program variables, source path, language
Servers.ini   target ADN or web server list e.g. ADN1 . . . ADNx
              Host: NOC.ADNx.com, Username, Password, FTP port
              Player form for each media type e.g. Flash, Silverlight,
              Web Object e.g. Podcast
Mediahost =
players.ADNag.com/players/VOD/player.php?width=640&height=
480&icons=false&fullscreen=true&controlbar=over&autostart=
true&streamer=rtmp://
CDN1path =.fms.cdn.CDNag.com/cust1
CDN2path = .fms.cdn2.CDNag.com/cust1
CDN3path = .fms.cdn3.CDNag.com/cust1     # these do not have
to be the same form, which allows for link translation and difficult
links formats from CDN to CDN.
Extensions.ini   player type list - depending on type of file a
different type player is generated to a different CDN
Check (Time)
Start (Log) output
Check to see if program is running already
Open (inventory file) so once file is transferred it is not transferred again
Get (FileList) from local source directory (traverse sub directories,
multiple levels supported)
Check (filetype) choose correct target locations e.g. ADN1 to host scripts
Do(string and path manipulation)    # to create custom urls that contain
different sub directories or mountpoints depending on location as required
by one CDN1 Vs another CDNx e.g. add /_definst_/ or even /mp4: for
media type itself
    Sub Function: This program then creates a newly generated
    script for each file, that follows the pseudo code of the CDN
    Aggregation Redirection System.
Function Put (FileList)
Open (FTP connection) try passive then port modes
Put (Filelist) to remote path
REPEAT Put (for ADNx)
Update(Log)
End
```

Figure 4:
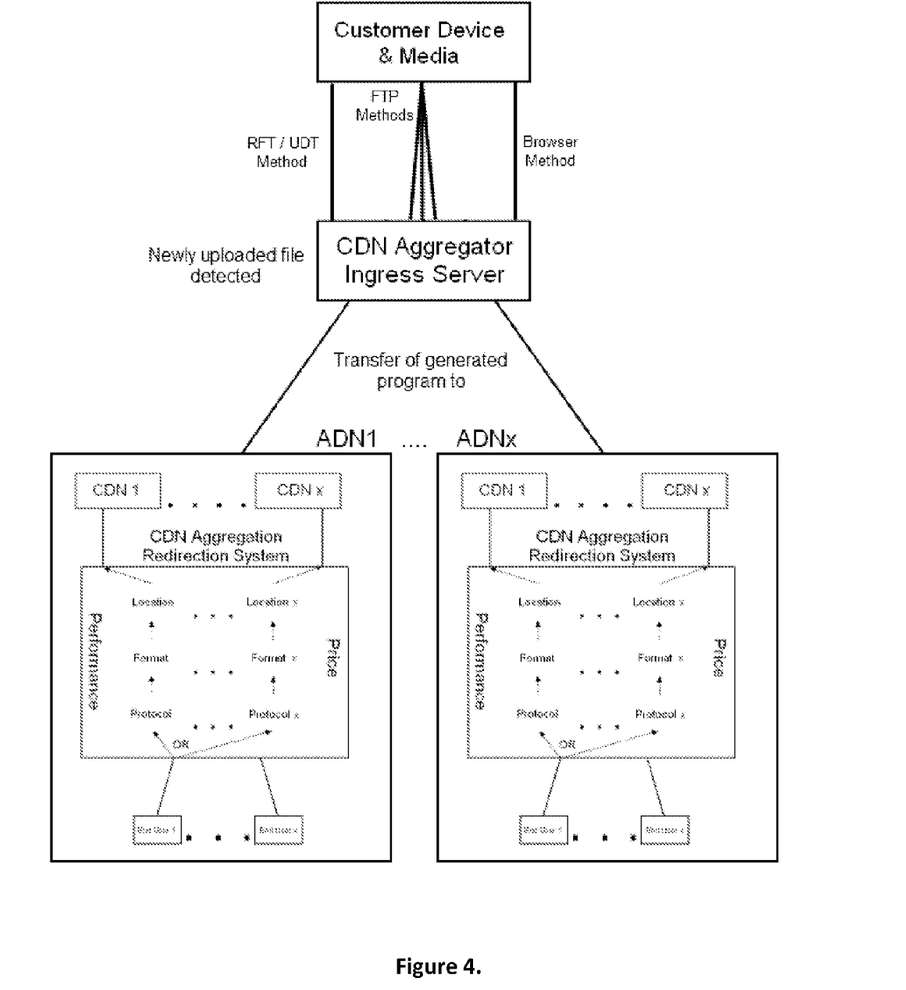
FIG. 4 depicts the configuration of a system hosting playergen and CDN redirection software.

FIG. 4 shows that by hosting the playergen and CDN redirection software on multiple ADNs instead of a single web server, a lot of the same benefits of hosting media on multiple CDNs are obtained. Global distribution, Load balancing, redundancy as well as run time/web acceleration.

All the executable scripts and software of the whole CDN Aggregation System will be hosted themselves on ADNs for run time purposes where as the media and player files are hosted on CDNs.

Linkgen

This software detects new content on any of the other server types and generates the correct format reference or link file e.g. Windows Media .asx, Real .ram, QT .mov and even web objects or podcasts. The file is uploaded to a web server and an email is generated and sent to a distribution list.

Protect

Link hijacking is a big problem online, a content owner's TV channel or video is linked to directly from another unauthorised website, bypassing their branding and advertising. This software changes the actual location of the media files on the server platform every few minutes making the original link useless. A viewer would have to return to the official website in order to get the latest link and view the content.

Portal

Statistics and Reporting system that pulls logs from multiple CDNs

Support

Support ticketing system, registering support tickets from customers and distributing them to relevant CDNs Other Features The NOC will operate as a distributed server platform located in multiple countries, DNS will allow for any outages redirecting customers to another NOC elsewhere.

The Rapid File Transfer software is also used on each NOC or Ingress server to clone any files that are uploaded regardless of their location, thus providing multiple mirrored backups.

Delivery of large and small objects, both video and non-video assets, storage.

Smooth Streaming or HTTP media delivery compatible.

Dynamic bitrate streaming or bitrate switching compatible.

Load Balancing over multiple CDNs is possible if the CDN Aggregation redirection system is setup to pass the first request to one CDN, the second request to a second CDN and so on.

The DNS cname that is setup to point to a particular CDN's own published address or URL can be updated to point to a different CDN if required. This can be done automatically by monitoring software which having detected a failure remotely changes the DNS entry.

CDN Aggregation Infrastructure

The system can be set up with the follow infrastructure:
1) Multihomed Internet Service Providers connections to a Cisco Router
2) Fibre Optic port connection to a HP Procurve Network Switch 2848 HPJ4904A HP E600 Redundant and External Power Supply
3) HP Proliant DL360 G7 Server
   Intel Xeon Quad Core 2.66 GHz CPU
   12 GB RAM
   x5 HP Dual Port Enterprise, hard drive, 146 GB, SAS-2 as RAID
   Dual Hot swap Power Supplies
   Dual Gigabit Network ports
   ILO for remote power and lights out management.
4) 4 GB SD RAM Card
5) VMware ESXi 4.1 Host for Virtualised Guest Operating Systems.
6) Netgear Ready NAS 4200 8TB VMware Ready iSCSI SAN (Storage Area Network)

VMware ESXi is installed as the host OS on the SD RAM Card and one of the Hard Disks (as a backup), this means the server has a Linux based management OS with a very small surface area reducing chance of successful attack by hackers. The VMware Vsphere client is used to connect remotely to the ESXi host and install Operating Systems of various types. In this case the Windows Server 2008 OS was used but CDN Aggregation system is compatible with Windows Server 2003 and Linux Operating Systems like Red Hat or Fedora. VMware allows for automatic backups locally or to the Storage Array and can failover allowing for high availability. VMware Vmotion can move live guest virtual machines between hosts with no impact on end users. In this way the Virtual Machines and system can also be hosted in the Cloud.

1) The Windows OS is then used as a Web Server (either IIS or Apache) to delivery web pages and run the scripts e.g. PHP of the CDN Aggregation Software:

CDN Aggregator Upload

A browser based upload software that allows any end user to upload content to the ingress servers without having the technical knowledge to use FTP or buy an FTP client. Also useful as a trial or evaluation tool. Has a progress bar showing % of upload completed so far (accurate using server side technology).

CDN Aggregator Provision

Software for automatically provisioning a new customer account. The web based interface allows non technical staff to login and create a new instance of the CDN software. They also allocate a username and email address which is then used by the playergen software for publishing of their media.

CDN Aggregator NOC

The CDN Aggregator software redirects end users to their nearest CDN depending on where they are located globally this increases quality of media delivery. Supports Live and On Demand content. Also can host an ingress server that automatically replicates content to constituent CDNs globally.

CDN Aggregator Playergen

This program generates CDN Aggregator Redirection scripts, links and actual media players for each piece of content. This is depicted in FIG. 3.

Once content is uploaded to the ingress server(s) the software detects it and automatically creates a CDN Aggregator Redirection script for each piece of content (dynamically generated) and uploads this new program to a web server or ADN (Application Delivery Network).

An email is then created and sent to a distribution list with the links to the media players in it. This link can be easily embedded by anyone into any web page or CMS using a simple IFRAME, DIV or object tag.

CDN Aggregator Linkgen

This software detects new content on any of the other server types and generates the correct format reference or link file e.g. Windows Media .asx, Real .ram, QT .mov and even web objects or podcasts. The file is uploaded to a web server or ADN and an email is generated and sent to a distribution list.

CDN Aggregator Protect

Link hijacking is a big problem online, a content owner's TV channel or video is linked to directly from another unauthorised website, bypassing their branding and advertising. This software changes the actual location of the media files on the server platform every few minutes making the original link useless. A viewer would have to return to the official website in order to get the latest link and view the content.

2) Another Virtual Machine running Windows was used to run the:

CDN Aggregator Portal

Statistics and Reporting system that pulls logs from multiple CDNs

SQL Databases can be held on external storage.

CDN Aggregator Support

Support ticketing system, registering support tickets from customers and distributing them to relevant CDNs (Web Based)

CDN Aggregator Forum

Forum system, for end users to exchange questions, answers, ideas with each other and support agents (Web Based).

3) Another Virtual Machine was used to host the executable software for automatic synchronisation of all the files from the CDN Aggregation Ingress server to the various Ingress servers of the CDNs:

CDN Aggregator Transfer

Rapid File Transfer software with transfer speeds up to x10 faster than normal methods (e.g. FTP). As well as content uploading to servers it also supports point to point transfers e.g. of a Film from an Edit suite in London to another in LA.

Other features: UDT protocol transfers, Delta Transfers and swarming.

Server Locations

As the network connections to the server(s) are multihomed (from several ISPs) connectivity to the public internet is adequate. However as load or the location of the users grows internationally the system would benefit from a distributed install. For example the first installation location in a data centre in London, UK could be expanded to another location in Los Angeles, USA and then another to serve Far Eastern users in Tokyo, Japan. Users would be directed to their nearest CDN Aggregation ingress server based on their location and that would replicate their files to target CDNs from there. It would also be possible to synchronise all the ingress servers in order to have a backup of the user's media in multiple countries.

Executable scripts or application programs e.g. PHP can also be ingressed to the CDN aggregator and then replicated to a CDN that supports Application Delivery (Application Delivery Network or ADN). This means that not only are the user's scripts accelerated, load balanced and have failover protection but also the CDN aggregator's software itself.

Although the invention has been described in terms of particular embodiments, other embodiments will be apparent to persons of skill in the art. The scope of the invention is to be determined on the basis of the claims that follow.

What is claimed is:

1. A CDN (Content Delivery Network) aggregation system comprising a plurality of CDNs,
   a CDN aggregation ingress server having a redirection system associated with specific CDNs,
   means for replication of content to CDNs, and
   means for providing a link pointing to CDNs via the redirection system of the CDN aggregator
   wherein the redirection system is adapted to determine the location of an end user clicking the link and redirects that end user to an optimal CDN for that location.

2. The CDN aggregation system of claim 1, wherein the redirection system is adapted to determine the location of an end user by reverse IP address lookup.

3. The CDN aggregation system of claim 1, wherein the optimal CDN is the nearest, least congested, best quality or best priced CDN as determined by the CDN aggregator.

4. The CDN aggregation system of claim 1, wherein if no response is received by the end user, the link fails over to a backup CDN.

5. The CDN aggregation system of claim 4, wherein the backup CDN is specified in the link or a constituent media player reference file.

6. The CDN aggregation system of claim 5, wherein the constituent media player reference file comprises data (xml) for a media player.

7. A CDN (Content Delivery Network) aggregation system comprising a plurality of CDNs,
   a CDN aggregation ingress server having a redirection system associated with specific CDNs,
   means for replication of content to CDNs, and
   means for providing a link pointing to CDNs via the redirection system of the CDN aggregator
   further comprising
   a media player that pulls an external URL or data file, wherein the link is directed to the media player.

8. The CDN aggregation system of claim 7, wherein the data file comprises data (xml).

9. An ADN (Application Delivery Network) aggregation system comprising a plurality of ADNs,
   an ADN aggregation ingress server having a redirection system associated with specific ADNs,
   means for replication of content to an ADN, and
   means for providing a link pointing to the ADN via the redirection system of the ADN aggregator
   wherein the redirection system is adapted to determine the location of an end user clicking the link or using the application and redirects that end user to an optimal ADN for that location.

10. The ADN aggregation system of claim 9, further comprising a link, reference or application that pulls an external URL or data file, wherein the link is directed to the ADN.

11. The ADN aggregation system of claim 10, wherein the data file comprises data (xml).

12. The ADN aggregation system of claim 10, wherein the redirection system is adapted to determine the location of an end user by reverse IP address lookup.

13. The ADN aggregation system of claim 9, wherein the optimal ADN is the nearest, least congested, best quality or best priced ADN as determined by the ADN aggregator.

14. The ADN aggregation system of claim 9, wherein if no response is received by the end user, the link falls over to a backup ADN.

15. The ADN aggregation system of claim 14, wherein the backup ADN is specified in the link or application or reference file.

16. The ADN aggregation system of claim 15, wherein the application or reference file comprises data (xml).

* * * * *